Aug. 2, 1960    J. J. KOWALIK    2,947,129
UTILITY FORAGE HARVESTER
Filed Oct. 23, 1957    2 Sheets-Sheet 2
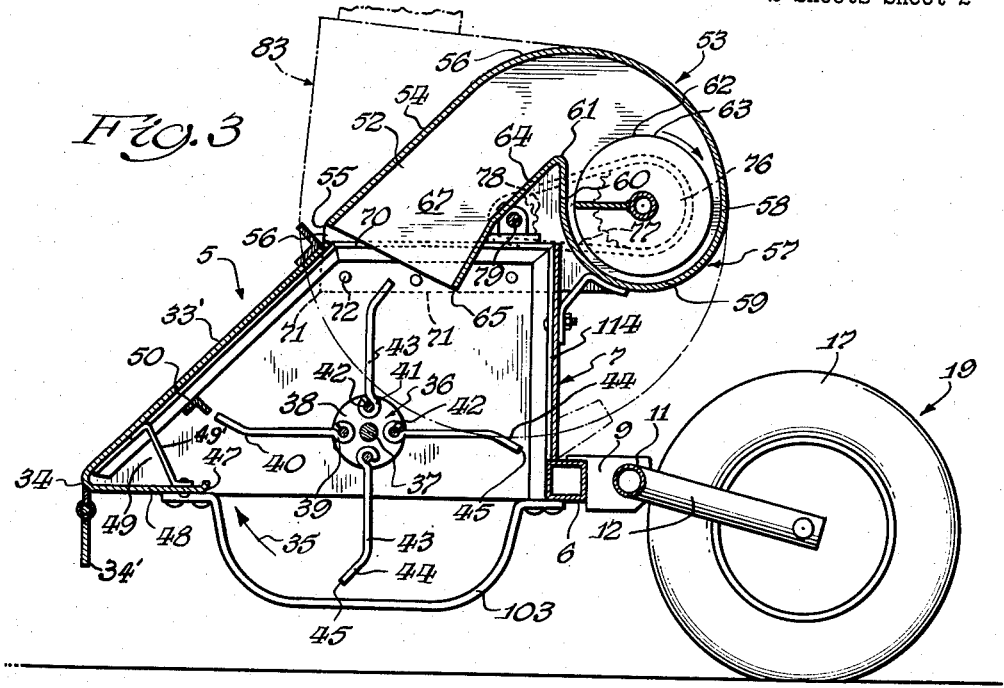
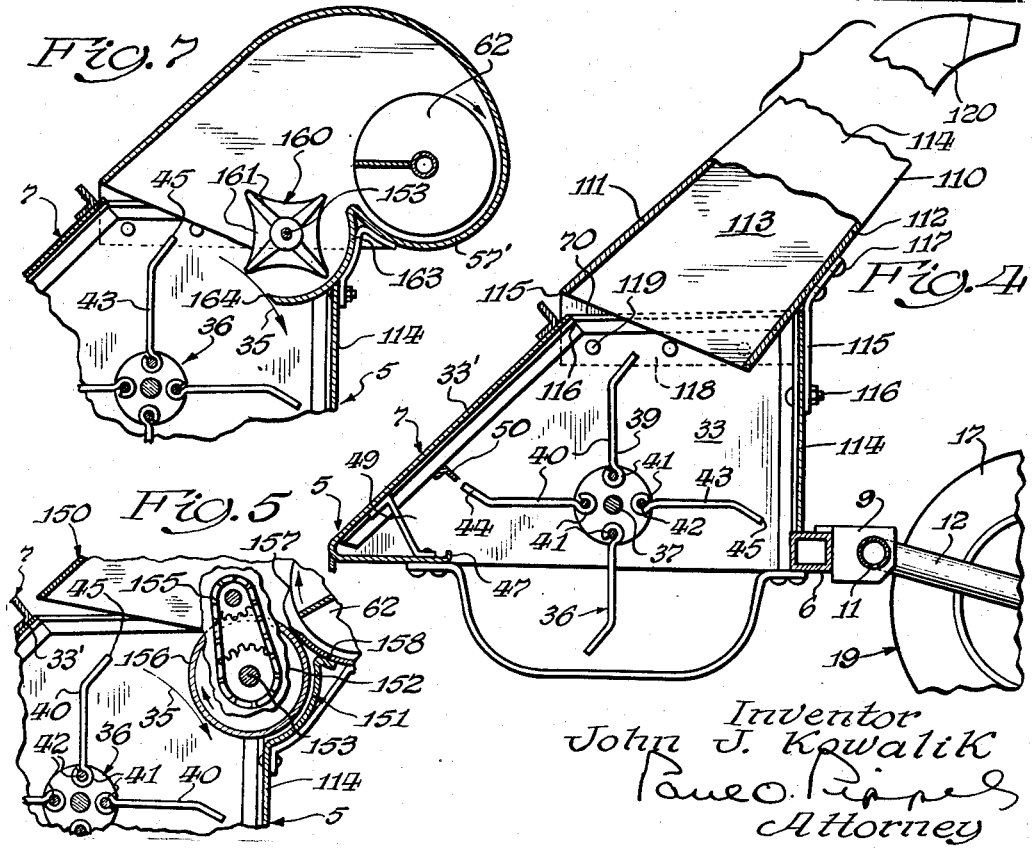
Inventor
John J. Kowalik
Paul O. Pippel
Attorney

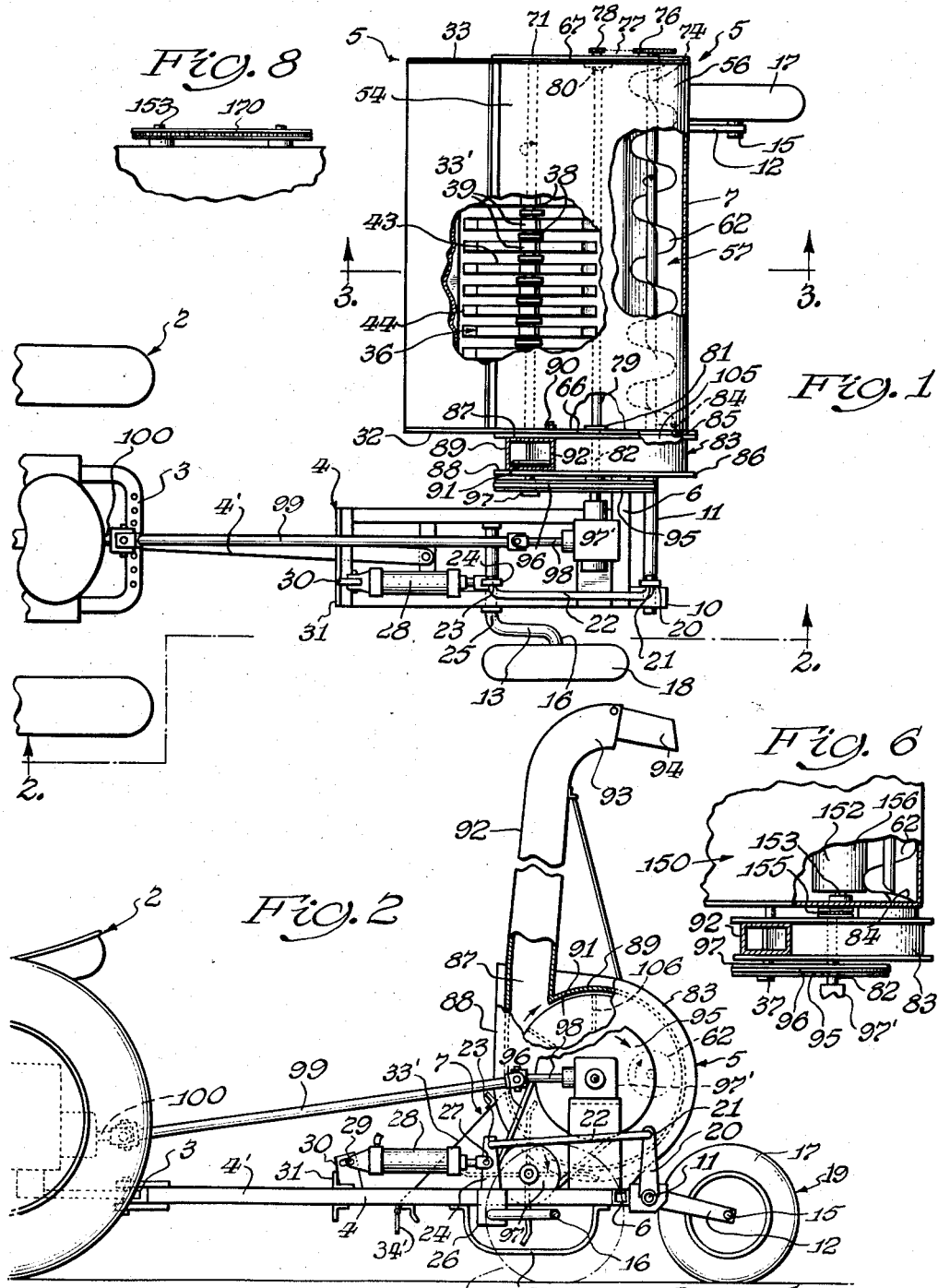

United States Patent Office 2,947,129
Patented Aug. 2, 1960

2,947,129

UTILITY FORAGE HARVESTER

John J. Kowalik, Glenview, Ill., assignor to International Harvester Company, Chicago, Ill., a corporation of New Jersey Filed Oct. 23, 1957, Ser. No. 691,955

6 Claims. (Cl. 56—1)

This invention relates to forage harvesters and more specifically to a type which utilizes a hammer knife rotor which serves to cut the material and also to convey it to an associated receiver.

A general object of the invention is to provide a novel basic harvester unit of simple and economic design which is alternatively adaptable for connection either to a discharge duct for conveyance directly to an associated wagon or mounts a conveyor blower combination for delivery thereby into the wagon.

A more specific object of the invention is to provide a novel arrangement of components so combined as to gather the maximum amount of crops with the minimum amount of dirt.

A still further object of the invention is to provide a novel basic chopper head and housing therefor which with equal facility mounts a duct for direct discharge or a conveyor-blower combination.

A still further object of the invention is to provide a novel rotor shredder and housing combination wherein the walls of the housing are arranged not only to control the flow of the material but also to bounce the material back into the rotor immediately after the material is cut so that the knives on the rotor are afforded an adequate opportunity for chopping up the material into particles of desired size.

These and other objects of the invention will become more apparent from the specification and the drawings, wherein:

Figure 1 is a plan view of the novel harvester shown in association with a tractor fragmentarily shown, portions of the harvester housing being broken away and parts shown in section in order to more clearly illustrate the various components therein;

Figure 2 is a side elevational view of the structure shown in Figure 1 with portions through the blower along the line 2—2 in Fig. 1 shown in vertical section and broken away;

Figure 3 is an enlarged vertical sectional view taken substantially on the line 3—3 of Figure 1;

Figure 4 is a sectional view comparable to Figure 3 illustrating the direct throw attachment;

Figure 5 is a fragmentary sectional view comparable to Figure 3 illustrating a modification of the invention;

Figure 6 is a fragmentary plan view of the structure of Figure 5 with a portion broken away and shown in horizontal section;

Figure 7 is a vertical sectional view comparable to Figure 3 of a further embodiment of the invention; and Figure 8 is a plan view of a portion of the structure of Figure 7.

*Embodiment of Figures 1–3*

Describing the invention in detail and having particular reference to the embodiment shown in Figures 1 through 3, there is illustrated a tractor generally designated 2 which includes a drawbar 3 to which is pivotally connected to a dial hitch member 4' which is pivoted to a draft frame 4 of the harvester unit generally designated 5.

The draft frame 4 is connected at its rear end to a transverse main frame beam member 6 of the harvester unit 5 and this beam member extends transversely behind the truncated pyramidal shaped housing 7 of the unit 5 and affords a pivotal mounting on rearwardly extending brackets 9 and 10 of the beam member 6 for a rockshaft 11 to which is connected a rearwardly extending arm 12 having a rear end provided with a generally horizontal transverse spindle 15 mounting a wheel 17 of a wheel assembly 19 which is disposed in trailing relationship to the harvester unit 5, inwardly of its outboard or grassward side. The wheel assembly 19 is pivotal on a generally horizontal axis via the rockshaft 11 and actuated by means of an upstanding arm 20, the upper end of which is pivotally connected to the rear end 21 of a link 22 which at its forward end is pivoted as at 23 to an upstanding arm 24 which at its lower end is connected to a shaft 25 which is pivotally mounted by a bracket assembly 26 to the draft frame 4. The spindle 25 is integrated with a crank arm 13 which has an outwardly extending transverse horizontal stub portion 16 which mounts the wheel 18. The arm 24 is pivoted as at 27 intermediate its ends to one end of a hydraulic ram 28 which at its forward end has a lost-motion pivotal connection at 29 to an anchor 30 which is connected or integrated with the forward end 31 of the draft frame 4.

The basic housing structure 7 comprises a pair of vertical generally flat inboard and outboard side panels 32 and 33 and a diagonal upwardly and rearwardly sloping substantially flat front wall or panel 33' interconnecting the side walls along the front edges, said front wall 33' being disposed at an angle of from about 45° to 55° and at its forward end or extremity 34 from which pivotally depend a plurality of edge to edge transversely aligned dependent flaps 34' which are spaced a considerable distance from the peripheral path 35 of the rotor or chopper crop collecting rotor generally designated 36.

The chopper 36 is a combination chopper and blower and comprises a substantially horizontal center shaft 37 journalled through suitable bearings on the side walls 32 and 33, said shaft having a plurality of disks 38 connected thereto between which are interposed the root or the inner end 39 of the knives or hammers or members 40 which provide eyes 41 at their inner ends to which are passed the shafts 42 and through appropriate openings in the disks 38 for securing the knives to the shaft assembly 37, 38. The knives preferably have a flat shank portion 43 and have a forwardly angled outer end portion 44 at about a 35° to 45° inclination to the axis of the shank portion 43. The knives are spaced angularly and axially on the shaft assembly 37, 38.

It will be observed that the outer tips or extremities 45 of the knife pass in close proximity to the edge 47 of the combination shelf and shear bar 48 which in the present instance is shown as integrated with the lower extremity 34 of the front panel 33'. However, it will be understood that this may be made as a separate piece or otherwise. It will be seen that the shear bar 48 is disposed generally horizontally although it may angle downwardly and rearwardly depending on the disposition of the housing about the wheels 17 and 18. Thus a pocket 49 is formed ahead of the chopper 36 and as the material is cut and swept upwardly by the knives on the forward side 48' of the chopper a considerable portion of this material is thrown between the braces 49' into this pocket 49, the material bouncing back into the knives, then being shredded by the knives against a shear bar 50 which extends generally parallel to the axis of the shaft 37 and spaced vertically with respect to the shear bar 47, the shear bar 50 being suitably connected to the front panel structure 33'. This shear bar 50, of course, is optional depending upon the amount of comminution that is required of the material. It will be observed that the panel 33' is tangential to the peripheral path 35 of the chopper head 36 whereby the material is caused to bounce against the panel and rebound into the cutter head so that the knives may pass at high speed through this material and not only additionally shear it but fling it upwardly into the duct portion 52 of the conveying unit generally designated 53 which is disposed entirely upwardly and above the peripheral path 35 of the chopper and over the wheel 17 which is tucked thereunder.

The conveying unit 53 includes the duct 52 which has a top or forward wall 54 which at its lower edge 55 is spaced upwardly and rearwardly of the panel 33' to provide an air inlet 56 through which air is aspirated in order to aid the movement of the material through the duct as it is flung by the cutter head 36. As best seen in Figure 3, the air inlet 56 is ahead of the discharge region of the chopper and in front of the axis of rotation thereof. The wall 54 generally parallels the wall 33' and is substantially flat and at its upper extremity merges into a deflector 56 which curves upwardly and rearwardly in a gradual arc and then downwardly and merges into a conveyor through 57 which is substantially U-shaped in vertical section and comprises a back wall portion 58 which extends into a bottom wall portion 59 which in turn continues into an upwardly extending forward portion 60, the latter having the upper extremity 61 close to the upper edge 62 of the auger 63 which is disposed in the trough 57. The wall 61 at its upper edge 62 is integrated with a downwardly and forwardly inclined cutoff or rear wall 64 of the duct portion 52, the panel 64 terminating in a lower margin 65 just outside the peripheral path 35 of the shear head 36. The duct 52 extends the full width of the basic housing portion and has its inboard and outboard walls 66 and 67 telescoped within the upper end 70 of the basic housing and having panels 71 outwardly of these walls and connected thereto as by bolts or rivets 72 to the respective inboard and outboard walls of the basic housing.

The auger 62 is mounted at its outboard end 74 (Figure 1) from the wall 67 and is driven by a sprocket 76 through a chain 77 which is driven by a sprocket 78 which is driven by a countershaft 79 which is disposed beneath the panel 64, the countershaft 79 being suitably journalled as at 80 and 81 from the walls 66 and 67. The inboard end of the shaft 79 is formed as a continuation of the center shaft 82 of the blower housing 83 into which the material is fed from the delivery end 84 of the auger 62 through an opening 85. The blower 83 includes the housing 86 of conventional form having side walls 87 and 88 with a peripheral wall 89 therebetween, the opening 85 being in the wall 87. The wall 87 is suitably connected as by bolts 90 to the inboard wall 66 of the conveyor assembly 53. Within the housing 83 there is disposed the paddled blower wheel 91 which is connected to the shaft 82, the blower assembly 91 discharging the material upwardly through a tangentially disposed duct 92 which extends upwardly and terminates in a curved rearwardly extending upper portion 93 which mounts a deflector 94 for guiding the material into a trailing wagon (not shown) as will be readily understood by those skilled in the art.

The shaft 82 extends through the outer side wall 86 of the blower housing and mounts a large pulley 95 which drives a belt 96 which in turn drives a pulley 97 which is connected to the rotor shaft 37. The shaft 82 continues into a gear box 97' which is suitably mounted on the framework 4, the gear box including a set of miter gears as will be readily understood by those skilled in the art and having a forwardly extending input shaft 98 which is connected through a shaft 99 by universal joints, to the power take-off shaft 100 of the tractor.

*Operation of the device*

After the unit is attached through the hitch tongue 4' with the draft bar 3 and the shafting 99 is suitably connected to the gear box 97' and the shaft 100 the unit is ready for operation. In transporting to the field the ram 28 is suitably actuated to rotate the wheels 17 and 18 downwardly, that is, in a clockwise direction as seen in Figure 2, in order to raise the unit. The unit in the field is lowered by retracting the ram 28 and the lowermost position is controlled by the runners 103 which are disposed at opposite sides of the housing and connected to the plate 47 and the main beam structure 6, as best seen in Figure 3. The power take-off is engaged and the sequence of rotation of the various parts through the various connections as explained is obvious whereby the rotor rotates with its forward side upwardly and the material delivered into the housing against the wall 33 with a slinging effect thereagainst and if too voluminous bounces back into the rotor and is flung up into the duct 52. The material which is deposited in the trough 59 then is delivered by the auger 62 into the blower 83 and in the present instance there is provided at the inlet opening 85 a shear plate 105 which cooperates with the series of combined blades and knives 106 of the blower unit 83 so that additional shredding of the material is accomplished. The blower then delivers the material upwardly through the duct 92 and out through the discharge end of the duct.

*Embodiment of Figure 4*

Referring now to the embodiment of the invention shown in Figure 4, the basic structure is identical with that shown in Figures 1 to 3, and identified by corresponding numerals but in lieu of the conveyor and blower combination 53 is a direct throw unit and there is substituted for the unit 53 a duct 110 which mounts across and fills the opening 70 in the upper extremity of the basic unit. The duct includes front and rear walls 111 and 112 and side walls 113 and 114 and is in the form of a truncated pyramid, which is also the shape of the basic unit and which includes in addition to the front and side walls a rear wall 114 which carries a brace 115 connected thereto as by bolt 116 the brace being connected at its upper end by rivets 117 to the back wall 112 of the discharge duct 110. It will be seen that the front wall 111 angles upwardly and rearwardly at a slightly greater inclination than the front wall 33 of the basic unit and that it is spaced upwardly and rearwardly at its lower forward end 115 from the upper rearward extremity 116 of the basic unit. The side walls of the duct 110 are suitably connected by means of depending side plates 118 as by rivets or bolts 119 to the sides 32 and 33 of the basic unit. The chute at its lower end is of the width of the basic unit and tapers upwardly into a narrow rearwardly curved discharge spout 120.

*Embodiment of Figures 5 and 6*

Referring now to the embodiment shown in Figures 5 and 6, it will be noted that the basic unit 5, is identical with that shown in the previous embodiments and that corresponding parts are identified by the same reference numerals. It will be seen that in the present instance the conveyor component generally designated 150 is almost identical with 53 but has been slightly modified in that it incorporates a transition conveyor means 151 in the form of a smooth roll 152 which is mounted on the countershaft 153 corresponding to shaft 79 of the embodiments of Figures 1 through 3, the shaft 153 being disposed lower than the shaft 79 and being interconnected with the shaft 82 of the blower by means of a chain and sprocket drive 155. It will be seen that the periphery 156 of the smooth-faced roller 152 passes in close proximity to the peripheral path 35 of the rotor structure 36 and that any material which tends to deposit onto the periphery 156 of the roller will be passed over the top of the roller in view of its overshot direction of rotation as best seen by the arrow in Figure 5 to be scraped off by the sharpened edge 157 of the conveyor trough 158 within which the auger 62 operates.

*Embodiment of Figures 7 and 8*

Referring now to the embodiment of the invention shown in Figures 7 and 8, it will be seen that it is similar to that shown in Figures 5 and 6 with the exception that the smooth-faced roller has been substituted by a somewhat star-shaped paddle roll generally designated 160 which includes a plurality of cupped or trough-shaped circumferentially displaced plate areas 161 which are adapted to receive the residual material from the rotor 36 and throw the material upwardly into the auger 62. It will also be seen that in this embodiment there is provided a trough-like shield 163 under the paddle roll 160 and extends from the upper end of the auger trough 57' and terminates in edge 164 in close proximity to the peripheral path 35 of the chopper head 36.

In each of the embodiments shown in Figures 5, 6 and 7 the outer end of the shaft 153 drives the auger 62 through the sprocket and chain assembly 170 as seen in Figure 8.

What is claimed is:

1. A harvester adapted to advance over a field of crop, comprising: supporting structure including first and second sides spaced apart transversely of the line of advance; crop-receiving means carried by the supporting structure adjacent to the first side and including a blower housing, a blower in the housing and a blower shaft supporting the blower and rotatable about a transverse horizontal axis, said shaft having an end portion projecting externally of the blower housing at the first side of the supporting structure; an elongated auger transverse to the line of advance and having its axis parallel to but offset radially from the blower shaft axis, said auger having a first end feeding into the blower housing and a second end including a shaft portion adjacent to the second side of the supporting structure; a transverse auger trough embracing the auger; a crop-collecting rotor having an axially elongated central shaft positioned ahead of and parallel to the auger and operative to collect field-borne crops and deliver such crops to the auger for feeding into the blower housing, said rotor shaft having a first end portion at the first side of the supporting structure and ahead of the blower shaft end portion and a second end portion at the second side of the supporting structure, first drive means at the first side of said supporting structure and interconnecting the blower shaft end portion and the first end portion of the rotor shaft, a rotatable structure generally parallel to the rotor shaft and disposed behind the rotor and having a first end portion at said first side proximate to said blower shaft and connected thereto and having a second end portion at the second side of the structure, and second drive means at the second side of the supporting structure and interconnecting the second end portion of the rotatable structure and the auger shaft.

2. A harvester comprising a structure including a housing, an elongated rotor substantially coextensive in length with the housing journalled thereon for rotation about a generally horizontal axis to generate a cylinder while collecting field-borne crops, conveying means mounted upon the structure communicating with the housing, and transition means interposed between said rotor and said conveying means and including a rotary member rotatably supported in the housing and having a peripheral conveying surface between said cylinder and said conveying means and moving in the direction delivering crops from the former to the latter and said conveying means including a shaft and a drive connection between the rotary member and conveying means.

3. The invention according to claim 2 and further characterized in that said conveying surface is undulated.

4. A harvester adapted to advance over a filed of crops, comprising: supporting structure including first and second sides spaced apart transversely of the line of advance; crop-receiving means carried by the supporting structure adjacent to said first side and including a blower housing, a blower in the housing and a blower shaft supporting the blower and rotatable about a transverse horizontal axis, said blower shaft having a first end portion projecting externally of the blower housing at the first side of the supporting structure; an elongated auger transverse to the line of advance and having its axis parallel to but offset from the blower shaft axis, said auger having a first end feeding into the blower housing and a second end including a shaft portion adjacent to the second side of the supporting structure; a transverse auger trough embracing the auger; a crop-collecting rotor having an axially elongated central shaft positioned ahead of and parallel to the auger and operative to collect field-borne crops and deliver such crops to the auger for feeding into the blower housing, said rotor shaft having a first end portion at the first side of the supporting structure and ahead of the blower shaft end portion and a second end portion at the second side of the supporting structure and ahead of the aforesaid auger shaft portion; said blower shaft having a second end portion remote from said first side of the support; a countershaft supported on the structure and having a first end portion adjacent to said first side of said structure and a second end portion at the second side of the structure, first drive means adjacent to the first side of the supporting structure and interconnecting the blower shaft second end portion and the first end portion of the rotor shaft; second drive means at the first side of the supporting structure interconnecting the first end portions of the blower shaft and countershaft; and third drive means at the second side of the supporting structure and interconnecting the second end portion of the countershaft and the auger shaft.

5. The invention according to claim 4 and a member connected to the countershaft and having a crop transferring surface extending between the rotor and the auger trough.

6. The invention according to claim 5 and said surface being scalloped.

References Cited in the file of this patent

UNITED STATES PATENTS

| 2,388,212 | McElhoe et al. | Oct. 30, 1945 |
| 2,663,985 | Hinson | Dec. 29, 1953 |
| 2,725,704 | Skromme | Dec. 6, 1955 |
| 2,786,317 | Lundell | Mar. 26, 1957 |
| 2,795,913 | Skromme et al. | June 18, 1957 |
| 2,817,945 | McClellan | Dec. 31, 1957 |